Patented June 25, 1940

2,205,663

UNITED STATES PATENT OFFICE 2,205,663

ICE COLOR PRODUCING COMPOSITION

Hans Z. Lecher, Plainfield, Robert P. Parker, Somerville, and Henry Philip Orem, North Plainfield, N. J., assignors to American Cyanamid Company, New York, N. Y., a corporation of Maine No Drawing. Application December 23, 1939, Serial No. 310,820

10 Claims. (Cl. 8—45)

This invention relates to the art of dyeing and printing ice colors. Specifically it relates to new dye producing compositions and the processes for applying them on materials, particularly textile materials.

More specifically, the present invention relates to compositions comprising an ice color coupling component and a stabilized diazo compound. The stabilized diazo compounds used in this invention are condensation products of diazotized polynuclear amines free from solubilizing groups, with guanidyl carboxylic acids free from azoic coupling groups. The diazo components dealt with in the present invention will be referred to in the specification and claims as ice solor diazo components because of their common use in this type of colors. Diazo compounds, diazotized amines and diazo components when referred to broadly will include compounds containing more than one diazo group or more than one amino group such as tetrazo compounds or diamines.

The present invention is based on the discovery that a coupling reaction will not take place in compositions containing condensation products of diazotized polynuclear amines free from solubilizing groups with guanidyl carboxylic acids free from azoic coupling groups and ice color coupling components, either in a solid blend or in alkaline solution, but does after treatment with acids that split the products into their original components. Therefore, these new dye producing compositions are very useful in the art of printing ice colors as they can be stored and shipped as solid blends or as alkaline solutions without premature dyestuff formation. They can also be used for making up stable alkaline printing pastes without producing color and then the color can be developed on the print by treatment with weak acids or acid vapors in the usual manner.

We do not, in the present application, claim as new compounds the stabilized diazo compounds used in the dye producing compositions of the present invention. These stabilized diazo compounds are a part of the subject matter of and are claimed in our copending application Serial Number 310,819, filed December 23, 1939, and correspond most probably to the following general formula: $X-(N=N-G)_n$, in which $X$ is a radical of a polynuclear ice color diazo component, $G$ is a radical of a guanidyl carboxylic acid or of its alkali metal or ammonium salt and $n$ is 1 or 2.

It is not certain just where the azo group connects with the guanidine radical and the present invention is not limited to any particular theory of the formula of the compound. The following sample formulas are believed to correspond to the most probable structure, but it is possible that the azo group or the C=N double bond may be shifted to another nitrogen atom because of tautomerism

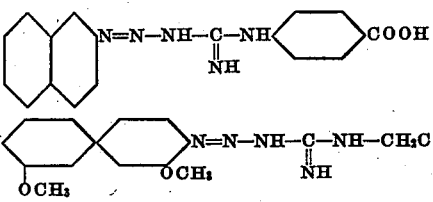

The present invention is not limited to the use of stabilized diazo compounds deriving from any particular guanidyl carboxylic acid. On the contrary, it is applicable to the use of derivatives of any guanidyl carboxylic acid as long as it contains a reactive hydrogen atom attached to a nitrogen atom and having been capable of reacting with the diazotized amine of the type referred to. Such guanidyl carboxylic acids are, e. g., guanidyl acetic acid (guanyl glycine, glycocyamine), alpha guanidyl propionic acid (guanyl alanine), p-guanidyl benzoic acid; heterocyclic guanidyl carboxylic acids such as guanyl proline or guanyl pyridine carboxylic acids; guanidyl dicarboxylic acids such as guanyl glutamic acid and guanidyl phthalic acid; guanidyl acids having both carboxylic and sulfonic groups such as guanidyl sulfobenzoic acids.

The guanidyl group itself may be substituted, creatine, e. g., being a very useful stabilizer. The radical substituting the guanidyl group or connecting the guanidyl groups with the acidic groups may be further substituted provided that the substituent does not make the radical capable of azoic coupling as hydroxyl or amino groups would do with an aromatic radical, thus 2-chloro-4-guanidyl benzoic acid may be used as a stabilizer.

It is therefore an advantage of the present invention that the stabilized diazo compounds used may be derived from practically all polynuclear ice color diazo components including the type of compounds having the ring systems condensed and those in which the ring systems are not condensed with each other.

Typical polynuclear amines which may be diazotized or tetrazotized and reacted with guanidyl carboxylic acids are the following: amino biphenyls such as xenylamine, benzidine, o-tolidine, o-dianisidine, 3,3'-dichlorobenzidine. Alpha and beta naphthylamine, 1,3 diamino naphthalene, 2-methoxy-1-naphthylamine. Alpha amino anthraquinone. 2-amino-3-nitrofluorene and 2-amino-3-nitrofluorenone. Amino carbazoles such as 2-amino carbazole, 3,6 diamino carbazole, 2-nitro-3-amino carbazole. 2-nitro-3-amino dibenzo-furan, 2-amino-3-nitro benzothiophene, 1-amino-5-fluorobenzothiazole. 4,4'-diamino stilbene. Amino diarylamines and their ether derivatives and their nitro derivatives such as, e. g., 2-methoxy-5-amino diphenylamine, 4-methoxy-4'-amino diphenylamine, 4-ethoxy-4'-amino diphenylamine, 3,4'-dinitro-4-amino diphenylamine, 4,4'-diamino diphenylamine, 2,2'-dimethyl-4,4'-diamino diphenylamine. Amino derivatives of aromatic ethers such as 2-amino diphenyl ether, 2-amino-4-acetyl diphenyl ether, benzyl-2-amino phenyl ether, 4-chloro-2-amino diphenyl ether, 4-amino-2-chloro diphenyl ether, 4-amino-4'-chloro diphenyl ether, 4,4'-dichloro-2-amino diphenyl ether, 2,2'-5'-trichloro-4-amino diphenyl ether. Mono acyl derivatives of diamines such as N-hexa hydro benzoyl p-phenylene diamine, N-hexahydro benzoyl p-toluylene diamine, N-benzoyl p-phenylene diamine, 2-benzoylamino-4-amino anisole, 2-hexahydro-benzoylamino-5-amino anisole, 2-amino-5-benzoylamino hydroquinone dimethyl ether and diethyl ether, 2-amino-5-furoyl amino hydroquinone dimethyl ether and diethyl ether and corresponding derivatives having instead of the furoyl group the radical of thiophene carboxylic acids. 2-amino-5-hexahydrobenzoylamino hydroquinone dimethyl ether and diethyl ether, 2-amino-5-phenoxy-acetylamino hydroquinone diethyl ether, the monobenzyl and monophenyl urethane of 2,5 diamino hydroquinone dimethyl and diethyl ether, 1-amino-3-benzoylamino-4,6-dimethoxy benzene; analogous mono aroyl derivatives of 2,5-diamino-4-alkoxy toluenes and of 2,5-diamino-4-diamino-4-alkoxy chlorobenzenes and of 2,5-diamino-4-alkoxy benzene sulfo dialkyl-amides; analogous mono aroyl derivatives of 1,3-diamino-4-6-dimethyl benzenes; the diethyl amide of 2-amino-4-(4'-chlorophenoxy)-benzoic acid. Mono acyl derivatives of diamino p-chloro phenyl ethers such as, e. g., 2-amino-4-chloro-5-acetylamino diphenyl ether, 2-benzoylamino-4-chloro-5-amino anisole. Amino derivatives of aromatic sulfones such as, e. g., 3-amino-4-methyl diphenyl sulfone, 2-amino-4'-methyl diphenyl sulfone, 2-amino-4-acetyl diphenyl sulfone, the ethyl ester of 3-amino-4-(p-toluene sulfonyl) benzoic acid, (4-methoxy-3-amino phenyl)-benzyl sulfone, 4-ethoxy-3-amino diphenyl sulfone. Amino azo compounds such as, e. g., 3,2'-dimethyl-4-amino azo benzene, 2-methyl-4-amino-5-methoxy-4'-chloro azo benzene, 4-amino-4'-nitro-3-methoxy-6-methyl azo benzene, 4-amino-4'-nitro-2,5-dimethoxy azo benzene, 4-amino-4'-chloro-3-methoxy-6-methyl azo benzene, the azo dye: diazotized o-anisidine coupled on alpha naphthylamine, 2,5-dimethoxy-4-amino-2'-ethyl carboxy-4'-nitro azo benzene, 2-acetylamino-4-amino-5-methoxy-2'-methyl sulfo-4'-nitro azo benzene. Amino derivatives of polynuclear ketones such as, e. g., 2,5-dibenzoyl aniline. Amino diphenyl methanes such as, e. g., 2-benzyl-1-chloroaniline. Amino derivatives of aryl esters of aromatic sulfonic acids such as, e. g., 2-amino-benzene sulfonic acid phenyl ester, 2-amino-4-chlorobenzene sulfonic acid p-cresyl ester. Amino xanthones.

The stabilized diazo compounds used in the present invention contain a solubilizing carboxylic group and therefore most of them are soluble in aqueous alkali or in aqueous solutions of ammonia, of amines, or of quaternary ammonium bases. In the case of alkali and of the strong quaternary ammonium bases such as tetra-ethanol ammonium hydroxide only an equivalent amount or a slight excess of the base is required to promote solution, but in the case of the weaker bases such as ammonia and the various amines a larger excess is necessary.

When these new ice color producing compositions are to be solid blends, salts of the stabilized diazo compounds with alkali metals or with quaternary ammonium bases are mixed with the coupling components. In case the new compositions are prepared in the form of solutions the stabilized diazo compound and the coupling component are dissolved in an alkaline medium. Ammonia or amines may, in this case also, be used as bases provided they are applied in sufficient excess to promote solution; however, the use of alkali or quaternary ammonium bases is preferable. Quaternary ammonium bases and particularly those that contain hydroxyalkyl groups have a decidedly stabilizing action on the solutions. Some of the stabilized diazo compounds used in the present invention are also soluble in polar organic solvents such as alcohols or acetone, particularly when such solvents contain some water, and therefore solid blends with the coupling components may be dissolved and used as solutions in such solvents. Obviously all solutions must be kept on the alkaline side to prevent coupling.

The stabilized diazo compounds used in the present invention are very stable even at elevated temperatures and are not explosive which is an important property as many diazo compounds present considerable explosion hazards. Their good solubility in solutions of bases, as pointed out above, is another important property and constitutes an additional advantage of the present invention. Their stability against alkaline hydrolysis which prevents these diazo compounds from coupling in alkaline solution is also an important factor in the compositions of this invention.

The stabilized diazo compounds may be combined with any of the ice color coupling components such as beta-naphthol, 8-amino-2-naphthol, 8-acetylamino-2-naphthol, benzoyl naphthols; pyrazolones and pyrazyl pyrazolones; hydroxy benzofluorenones; hydroxy derivatives of phenyl naphthylamines such as 7-hydroxy-1-naphthyl-m-hydroxy phenylamine; particularly various N-substituted amides such as arylides of 2-hydroxy-3-naphthoic acid, of 5,6,7,8 tetrahydro-2-hydroxy-3-naphthoic acid, of 2-hydroxy-3-anthroic acid, of methyl and dimethyl salicylic acids, of hydroxy carbazole carboxylic acids, of hydroxy benzocarbazole carboxylic acids, of hydroxy benzoacridone carboxylic acids, of 3,7-dihydroxy naphthalene-2,6-dicarboxylic acid, of hydroxy dibenzofuran carboxylic acids, of hydroxy benzothiophene carboxylic acids, etc.; arylides of acetoacetic acid, of furoyl acetic acid, of terephthaloyl bis acetic acid. The arylide group in the coupling component may be a simple aromatic group such as the radical of aniline or of an aniline derivative or of a naphthylamine, or it may be a radical of a diamine such as, e. g., of o-tolidine, or it may be the radical of a heterocyclic amine such as, e. g., of an amine of the benzothiazole series or of a diamine of the diphenylene oxide or diphenylene sulfone series. The ice color coupling component may also contain an azo group and even metallized azo dyes may be useful ice color coupling components such as, e. g., the copper complex of the combination p-chlor-o-amino phenol on resorcinol. Cutch may also be used as ice color coupling component.

The relative proportions of the stabilized diazo compound and the ice color coupling component present in these new compositions of matter may vary; however, we prefer to use approximately equivalent quantities, the coupling component being in slight excess. The mixtures may contain one or more reaction products of diazotized polynuclear ice color components with guanidyl carboxylic acids and one or more ice color coupling components since desirable shades are also obtained by using more than two components.

The mixture may also contain various assistants such as starches, gums, alkali, quaternary ammonium bases, wetting and dispersing agents.

The textile material is printed or impregnated with the mixture and then treated with an acid, preferably a weak acid, at elevated temperature. By this acid treatment the diazo-guanidine compound is hydrolyzed and coupled to form the azo dye. Acetic and formic acids give very favorable results, but many other weak acids, known to those skilled in the art, may be used with equally good effect. The acids may be applied either in the liquid or vapor state.

However, the ice color coupling component and the diazo compound need not be applied simultaneously, but the diazo compound may be applied after the coupling component with the same result.

When the ice color coupling component and stable diazo compound are printed as a mixture, it is possible to effect aging in a somewhat different manner from that described above. The goods, if sufficiently acid resistant, such as animal fibres, may be impregnated with an acid substance such as, e. g., sulfuric acid, sodium bisulfate and the like. The print is then made and the material steamed. The acid in the material effects splitting and develops the color. This method of impregnating the goods with an acid is not practical with materials which are not acid resistant, such as the various cellulosic fibres. In such a case, however, it is possible to use a material which liberates acid only when treated with steam. Such potential acidic substances are, e. g., sodium monochloroacetate, esters of acids that are hydrolyzed by steam such as glycerine monoacetate, ethylene monochlorhydrin, acid amides such as formamide, etc. The acid yielding material may be mixed with the printing paste, or the goods to be printed may be padded with the agent.

When the stabilized diazo compounds of the present invention are used in the form of salts with weak and volatile amines, or in solution in weak and volatile amines such as, e. g., diethyl ethanolamine, the development of the color may be accomplished by steam alone without any additional acid because the steam removes the amine and decreases the alkalinity of the printing paste. Furthermore, in making up the printing paste, if insufficient amounts of base are used and some of the stabilized diazo compound and of the coupling component remains undissolved, the prints may be developed with steam alone without any addition of acid or of a potential acid substance.

The processes of this invention produce excellent dyeings and printings on textile material as no side reactions take place in the formation of the azo dye. A further advantage is that the mixtures of the diazo compounds and the ice color coupling components are perfectly stable so that they may be stored without decomposition and explosion hazard. Furthermore, their alkaline printing pastes show a very high degree of stability and no premature formation of azo dyestuff takes place.

The processes of the present invention may also be used for simultaneous or separate printing with a different class of dyes, namely, the sulfuric acid esters of leuco compounds of vat dyes. It is an advantage of the present invention that composite prints are thus possible and it is not necessary to restrict the printing of goods to dyes of a single class.

Some typical mixtures of the present invention and their use in dyeing and printing textile materials will be illustrated in the following specific examples, it being understood, of course, that the invention is not broadly limited to particular details herein set forth. The parts are by weight.

*Example 1*

12.2 parts of o-dianisidine are stirred with 66 parts of 5N hydrochloric acid and 50 parts of water. The temperature is lowered to 5° C. and the diamine is tetrazotized by a solution of 7 parts of sodium nitrite in 15 parts of water. 240 parts of tetrazo solution are obtained. 15.8 parts of creatine and then 69.8 parts of 5N sodium hydroxide solution are added. The reaction is complete in one-half hour as shown by a negative diazo test with alkaline R salt. 47.8 parts of 5N sodium hydroxide solution are added and the solution is then treated with 20 parts of sodium chloride per 100 parts of solution. The precipitated material is filtered, dried in vacuum at 45° C. After grinding the product shows a red brown color and is readily soluble in water.

3.81 parts of this sodium salt of the condensation product (75% real) of tetrazotized o-dianisidine and creatine are intimately mixed in the 2.91 parts of 2-hydroxy-3-naphthoic acid o-toluidide. 5 parts of this mixture are pasted with 5 parts of ethylene glycol monoethyl ether, 2.5 parts 30° Bé. caustic, and 17.5 parts of water are added. The solution so obtained is thickened by addition of 70 parts of starch paste as a printing thickener. The color paste is printed on cotton cloth from a copper roll, the print is dried and the color developed by ageing with steam in the presence of acetic acid vapors. The developed print is rinsed, soaped at elevated temperature, rinsed, and dried. A strong blue print of good fastness properties is obtained.

Development of the color by ageing in the presence of other weak acids such as formic or formic and acetic acids may be accomplished. When the use of an ager is inconvenient, the print may be developed by immersion in a hot acid bath at elevated temperature, such as one containing 20 parts formic acid (85%) and 30 parts of Glauber's salt.

*Example 2*

24.4 parts of o-dianisidine are dissolved in a boiling mixture of 600 parts of water and 59.5 parts of hydrochloric acid (1.19) and the solution is filtered. The solution is then cooled, iced to 0° C. and tetrazotized by the addition of 14 parts of sodium nitrite dissolved in 200 parts of water. A slight excess of sodium nitrite is added to insure complete tetrazotization. The solution so obtained is filtered. 40 parts of guanyl glycine are added and then 144 parts of 5N potassium hydroxide solution are run in. The solution is stirred 14 hours and is filtered after the addition of 96 parts of 5N potassium hydroxide solution. 70 parts of potassium carbonate per 100 parts of solution are added and the precipitated material is filtered, pressed and dried. After grinding, the product is of deep brown color and is readily soluble in water.

7.3 parts of this potassium salt of the condensation product (39% real) of tetrazotized o-dianisidine and guanyl glycine are intimately mixed with 2.91 parts of 2-hydroxy-3-naphthoic acid ortho-toluidide.

A printing paste is prepared from this mixture in a similar way to that described in Example 1. The color paste is printed on cotton cloth from a copper roll, the print is dried, and the color developed by ageing with steam in the presence of acetic acid vapors. The developed print is rinsed, soaped at elevated temperature, rinsed, and dried.

A strong blue print of good fastness properties is obtained.

Example 3

Cotton piece goods are padded with an alkaline solution of the anilide of 2-hydroxy-3-naphthoic acid in the usual manner and dried. The padded cloth is printed from a copper roll with the following paste:

| | Parts |
|---|---|
| The potassium salt of the condensation product (40.8% real) of tetrazotized o-tolidine and guanyl glycine prepared according to Example 4 | 2.5 |
| Ethylene glycol monoethyl ether | 5.0 |
| Sodium hydroxide (30° Bé.) | 2.5 |
| Water | 25.0 |
| Starch paste | 65.0 |
| Total | 100.0 |

The printed goods are dried and developed with live steam containing acetic acid vapors. The developed print is rinsed, soaped at 70° C., rinsed again, and dried. A blue print is obtained.

Example 4

5.05 parts of o-tolidine are stirred with 25 parts of water for 30 minutes and then 29.75 parts of hydrochloric acid (1.19) are added and the stirring is continued for 30 minutes. The temperature is lowered to 0° C. and the diamine is tetrazotized by the addition of 9 parts of 35% sodium nitrite solution within about one hour. The tetrazo solution is filtered before use. 6.43 parts of guanyl glycine are added and then 85.2 parts of 5N potassium hydroxide are run in. The reaction is complete after 15 minutes as shown by a negative diazo test on spotting against alkaline R salt. The temperature is lowered to 5° C. and 50 parts of potassium carbonate per 100 parts of solution are added. The precipitated material is stirred for 15 hours and is then filtered, pressed and dried at 25° C. under vacuum. After grinding the product shows an orange-red color and is soluble in water.

6.55 parts of this potassium salt of the condensation product (40.8% real) of tetrazotized o-tolidine and guanyl glycine, are intimately mixed with 2.76 parts of 2-hydroxy-3-naphthoic acid anilide.

A printing paste is prepared from this mixture according to the procedure described above under Example 1. The color paste is printed on cotton cloth from a copper roll, the print is dried, and the color developed by ageing with steam in the presence of acetic acid vapors. The developed print is rinsed, soaped at elevated temperature, rinsed, and dried.

A blue print is obtained.

Example 5

9.2 parts of benzidine are stirred with 50 parts of water for 30 minutes and then 59.5 parts of hydrochloric acid (1.19) are added and the stirring is continued for 30 minutes. The temperature is lowered to 0° C. by the addition of ice and the diamine is tetrazotized by the addition of 7.5 parts of sodium nitrite dissolved in 30 parts of water.

The tetrazo solution so prepared is cooled to 10° C. and 19.25 parts of guanyl anthranilic acid are added. Then 151 parts of 5N potassium hydroxide solution are added and the mixture is stirred 15 hours at 15° to 20° C. The reaction is complete as shown by a negative diazo test on spotting with alkaline R salt. The precipitated material is filtered, pressed and dried at 25° C. under vacuum. After grinding the product shows an olive brown color.

4.17 parts of this potassium salt of the condensation product (79% real) of tetrazotized benzidine and guanyl anthranilic acid are intimately mixed with 3.2 parts of 2-hydroxy-3-naphthoic acid o-phenetidide.

A printing paste is prepared from this mixture by a procedure similar to that described in Example 1. The color paste is printed on cotton cloth from a copper roll, and the color developed by ageing with steam in the presence of acetic acid vapors. The developed print is rinsed, soaped at elevated temperature, rinsed and dried.

A red violet print is obtained.

Example 6

6.55 parts potassium salt of the condensation product (40.8% real) of tetrazotized o-tolidine and guanyl glycine prepared according to Example 4, are intimately mixed with 1.89 parts of di-acetoacetyl benzidide.

A printing paste is prepared from this mixture in a manner similar to that described in Example 1. The color past is printed on cotton cloth from a copper roll, the print is dried, and the color developed by ageing in steam in the presence of acetic acid vapors. The developed print is rinsed, soaped at elevated temperature, rinsed and dried.

A reddish yellow print of good fastness properties is obtained.

What we claim is:

1. A color producing composition of matter which comprises an ice color coupling component and a stabilized diazo compound having the following general formula: $X-(N=N-G)_n$, in which $X$ is a radical of a polynuclear ice color diazo component, $G$ is a radical included in the group consisting of guanidyl carboxylic acid radicals free from azoic coupling groups, and their alkali metal and ammonium salts and $n$ is a whole number included in the group consisting of 1 and 2.

2. A color producing composition of matter which comprises an ice color coupling component and a stabilized diazo compound having the following general formula: X—(N=N—G)₂, in which X is a radical of the biphenyl group and G is a radical included in the group consisting of guanidyl carboxylic acid radicals free from azoic coupling groups, and their alkali metal and ammonium salts.

3. A color producing composition of matter which comprises an ice color coupling component and a stabilized diazo compound having the following general formula:

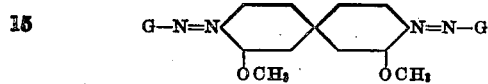

in which G is a radical included in the group consisting of guanidyl carboxylic acid radicals free from azoic coupling groups, and their alkali metal and ammonium salts.

4. A color producing composition of matter which comprises an arylide of 2-hydroxy naphthalene-3-carboxylic acid and a stabilized diazo compound having the following general formula:

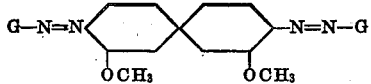

in which G is a radical included in the group consisting of guanidyl carboxylic acid radicals free from azoic coupling groups, and their alkali metal and ammonium salts.

5. A color producing composition of matter which comprises the o-phenetidide of 2-hydroxy naphthalene-3-carboxylic acid and a stabilized diazo compound having the following formula:

in which M represents a member of the group consisting of hydrogen, alkali metals or ammonium radicals.

6. A color producing composition of matter which comprises the o-toluidide of 2-hydroxy naphthalene-3-carboxylic acid and a stabilized diazo compound having the following formula:

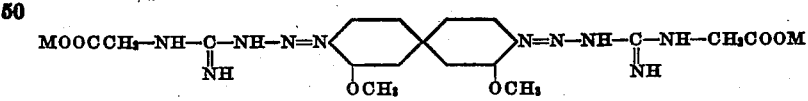

in which M represents a member of the group consisting of hydrogen, alkali metals or ammonium radicals.

7. An alkaline printing paste comprising a printing thickener associated with a mixture of an ice color coupling component and a stabilized diazo compound having the following general formula: X—(N=N—G)ₙ, in which X is a radical of a polynuclear ice color diazo component, G is a radical included in the group consisting of guanidyl carboxylic acid radicals free from azoic coupling groups, and their alkali metal and ammonium salts and n is a whole number included in the group consisting of 1 and 2, the paste being capable of developing color by treatment with weak acids at elevated temperature.

8. A process of coloring materials which comprises applying to the material a composition containing an ice color coupling component and a stabilized diazo compound having the following general formula: X—(N=N—G)ₙ, in which X is a radical of a polynuclear ice color diazo component, G is a radical included in the group consisting of guanidyl carboxylic acid radicals free from azoic coupling groups, and their alkali metal and ammonium salts and n is a whole number included in the group consisting of 1 and 2; and subjecting the material to the action of weak acids at elevated temperature.

9. A method of printing which comprises printing the material with an alkaline printing paste containing a mixture comprising an ice color coupling component and a stabilized diazo compound having the following general formula: X—(N=N—G)ₙ, in which X is a radical of a polynuclear ice color diazo component, G is a radical included in the group consisting of guanidyl carboxylic acid radicals free from azoic coupling groups, and their alkali metal and ammonium salts and n is a whole number included in the group consisting of 1 and 2; and developing the color by subjecting the material to the action of a weak acid at elevated temperature.

10. A method of coloring material which comprises applying to the material an ice color coupling component, then applying a dispersion of a stabilized diazo compound having the following formula: X—(N=N—G)ₙ, in which X is a radical of a polynuclear ice color diazo component, G is a radical included in the group consisting of guanidyl carboxylic acid radicals free from azoic coupling groups, and their alkali metal and ammonium salts and n is a whole number included in the group consisting of 1 and 2; and then developing the color by subjecting the material to the action of a weak acid at elevated temperature.

HANS Z. LECHER.
ROBERT P. PARKER.
HENRY PHILIP OREM.